(12) United States Patent
Kahn et al.

(10) Patent No.: US 7,467,276 B1
(45) Date of Patent: Dec. 16, 2008

(54) SYSTEM AND METHOD FOR AUTOMATIC ROOT VOLUME CREATION

(75) Inventors: Andy C. Kahn, San Francisco, CA (US); Blake H. Lewis, Los Altos Hills, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 258 days.

(21) Appl. No.: 11/257,507

(22) Filed: Oct. 25, 2005

(51) Int. Cl.
*G06F 12/00* (2006.01)
*G06F 13/00* (2006.01)
*G06F 13/28* (2006.01)
*G06F 15/177* (2006.01)
*G06F 9/00* (2006.01)
*G06F 9/24* (2006.01)
*G06F 1/24* (2006.01)
*G06F 11/00* (2006.01)

(52) U.S. Cl. .................. 711/166; 711/112; 711/170; 713/1; 713/2; 713/100; 714/2; 714/5; 714/6; 714/7; 714/8

(58) Field of Classification Search ............... 711/166
See application file for complete search history.

(56) References Cited

U.S. PATENT DOCUMENTS

| | | |
|---|---|---|
| 4,156,907 A | 5/1979 | Rawlings et al. |
| 4,399,503 A | 8/1983 | Hawley |
| 4,598,357 A | 7/1986 | Swenson et al. |
| 4,688,221 A | 8/1987 | Nakamura et al. |
| 4,698,808 A | 10/1987 | Ishii |
| 4,761,785 A | 8/1988 | Clark et al. |
| 4,805,090 A | 2/1989 | Coogan |
| 4,837,675 A | 6/1989 | Bean et al. |
| 4,864,497 A | 9/1989 | Lowry et al. |
| 4,896,259 A | 1/1990 | Jacobs et al. |
| 4,899,342 A | 2/1990 | Potter et al. |
| 4,989,206 A | 1/1991 | Dunphy, Jr. et al. |
| 5,124,987 A | 6/1992 | Milligan et al. |
| RE34,100 E | 10/1992 | Hartness |
| 5,155,835 A | 10/1992 | Belsan |
| 5,426,747 A | 6/1995 | Weinreb et al. |

(Continued)

FOREIGN PATENT DOCUMENTS

WO  WO 89/10594  11/1989

OTHER PUBLICATIONS

Administration Guide found at http://www.openafs.org/pages/doc/AdminGuide/auagd010.htm, visited on Mar. 2, 2005.

(Continued)

*Primary Examiner*—Kevin Ellis
*Assistant Examiner*—Ryan Bertram
(74) *Attorney, Agent, or Firm*—Cesari and McKenna LLP

(57) ABSTRACT

A system and method automatically generates a root volume for use by a storage operating system of a storage system. During initialization of the storage system, the storage operating system detects that no operational root volume exists and, in response, invokes a root volume generation process. The root volume generation process automatically creates a thinly provisioned flexible volume of the smallest allowable size on an aggregate. The created flexible volume is marked as the root volume for the storage system. The storage operating system then continues initialization utilizing the automatically generated root volume.

30 Claims, 12 Drawing Sheets

U.S. PATENT DOCUMENTS

| | | | |
|---|---|---|---|
| 5,581,724 | A | 12/1996 | Belsan et al. |
| 5,819,292 | A | 10/1998 | Hitz et al. |
| 6,636,879 | B1 | 10/2003 | Doucette et al. |
| 6,643,654 | B1 | 11/2003 | Patel et al. |
| 6,779,130 | B2 * | 8/2004 | Sprunt et al. .................... 714/6 |
| 7,017,038 | B1 * | 3/2006 | LaChance et al. .............. 713/2 |
| 7,162,600 | B2 * | 1/2007 | Kano et al. ................. 711/162 |
| 7,219,257 | B1 * | 5/2007 | Mahmoud et al. .............. 714/6 |
| 2004/0030668 | A1 | 2/2004 | Pawlowski |
| 2005/0010747 | A1 * | 1/2005 | Gilliam et al. ................. 713/1 |
| 2005/0246401 | A1 | 11/2005 | Edwards et al. |

OTHER PUBLICATIONS

Basilico, et al., *Error Correction System Using "Shadow Memory,"* IBM Technical Disclosure Bulletin, May 1984, pp. 5792-5793.

Bitton, Dina, *Disk Shadowing*, Proceedings of the 14$^{th}$ VLDB Conference, LA, CA (1988).

Blasgen, M.W. et al., *System R:An architectural Overview*,Reprinted from IBM Systems Journal vol. 20, No. 1, 1981 © 1981, 1999.

Borenstein, Nathaniel S., *CMU's Andrew project a retrospective*, Communications of ACM, (39)12, Dec. 1996.

Brown, Mark R. et al., *The Alpine file system*, ACM Transactions on Computing Systems, 3(4):261-293, Nov. 1985.

Chen, Peter M., et al., *An Evaluation of Redundant Arrays of Disks Using an Amdahl 5890* Performance Evaluation, pp. 74-85, 1990.

Chutani, Sailesh, et al., *The Episode file system*, In Proceedings of the USENIX Winter 1992.

Clark, B.E., et al., *Application System/400 Performance Characteristics*, IBM Systems Journal, 28(3): 407-423, 1989.

Corbett, Peter, et al., *System and Method for Reserving Space to Guarantee File Writability in a File System Supporting Persistent Considtency Point Images*, U.S. Appl. No. 10/423,391, filed Apr. 25, 2003.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglis, Fred, et al., *A comparison of two distributed systems: Amoeba and Sprite*—Computing Systems, 4(4), Fall 1991, pp. 353-385 ?{copy of article I have has no date or cite}.

Gait, Jason, *Phoenix: A Safe In-Memory File System*. Communications of the ACM, 33(1):81-86, Jan. 1990.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.

Howard, John H, et al. *Scale and Performance in a Distributed File System*, Carnegie Mellon University, CMU-ITC-87-068, Aug. 5, 1987.

Howard, John, H. et al., *Scale and performance in a distributed file system*, ACM Trans. Computer. System., 6(1), Feb. 1988 pp. 51-81.

Howard, John H., *An Overview of the Andrew File System*, Carnegie Mellon University, CMU-ITC-88-062.

*The IBM System/38*, Chapter 8, pp. 137-15.

Isomaki, Markus, *Differentiated Service for the Internet*, Department of Technical Physics and Mathematics, May 9, 1998.

Kazar, Michael L., et al., *Decorum File System Architectural Overview*, USENIX Summer Conference, Anaheim, California, 1990.

Lomet, David., et al., *The performance of a multiversion access method*, ACM SIGMOD International Conference on Management of Data, 19:353-363.

Lorie, Raymond, A, *Physical integrity in a large segmented database*, ACM Trans. Database Systems, (2)1: 91-104, Mar. 1977.

Lorie, RA, *Shadow Page Mechanism*, IBM Technical Disclosure Bulletin, Jun. 1986, pp. 340-342.

McKusick, Marshall Kirk, et al., *A Fast File System for UNIX*, Computer Science Division, Department of Electrical Engineering and Computer Sciences, Univ. of CA, Berkley, Feb. 18, 1994.

Miller, Ethan L., et al., *RAMA:A File System for Massively Parallel Computers*, 12$^{th}$ IEEE Symposium on Mass Storage Systems, Monterey CA, Apr. 1993, pp. 163-168.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., Et Al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Ousterhout, John K. et al., *The Sprite Network Operating System*, Computer Science Division, Department of Electrical Engineering and Computer Sciences, Univ. ofCA, Berkley, Nov. 19, 1987.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Ousterhout, John, *Why Aren't Operating Systems Getting Faster as Fast as Hardware?*, Digital WRL Technical Note TN-11, Oct. 1989.

Ousterhout, John, *A Brief Retrospective On The Sprite Network Operating System*, found at http://www.cs.berkeley.edu/projects/sprite/retrospective.html,visited on Mar. 11, 2005.

Patterson, D., et al., *A Case for Redundant Arrays of Inexpensive Disks (RAID)*,_Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*,_SIGMOD International Conference on Management of Data, Chicago, IL, USA, Jun. 1-3, 1988, SIGMOD Record (17)3:109-16 (Sep. 1988).

Peterson, Zachary Nathaniel Joseph, *Data Placement for Copy-on-Write Using Virtual Contiguity*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. And Computer Sciences, Univ. of CA, presented at Summer '90 USENIX Technical Conference, Anaheim, CA Jun. 1990.

Rosenblum, Mendel, et al, The *Design and Implementation of a Log-Structured File System* Jul. 24, 1991 pp. 1-15.

Rosenblum, Mendel, et al., *The Design and Implementation of a Log-Structured File System*, , In Proceedings of ACM Transactions on Computer Systems, (10)1:26-52, Feb. 1992.

Sandberg, Russel et al., *Design and implementation of the Sun Network Filesystem*, In Proc. Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITC Distributed File System: Principles and Design*, In Proceedings of the 10th ACM Symposium on Operating Systems Principles, (19)5:56-67, Dec. 1985.

Satyanarayanan,.M..*A survey of distributed file-systems.* Annual Review of Computing Science, 4(73-104), 1989.

Satyanarayanan, M., et al, *Coda: A highly available file system for a distributed workstation environment* Carnegie Mellon University, CMU-ITC.

* cited by examiner

SYSTEM AND METHOD FOR AUTOMATIC ROOT VOLUME CREATION

FIELD OF THE INVENTION

The present invention relates to storage systems and, more specifically, to automatic creation of a root volume on a storage system.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage (NAS) environment, a storage area network (SAN) and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of named data containers, such as directories, files and blocks. For example, each "on-disk" file may be implemented as a set of data structures, i.e., disk blocks, configured to store information, such as the actual data for the file. These data blocks are organized within a volume block number (vbn) space that is maintained by the file system. The file system organizes the data blocks within the vbn space as a "logical volume"; each logical volume may be, although is not necessarily, associated with its own file system. The file system typically consists of a contiguous range of vbns from zero to n, for a file system of size n+1 blocks.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., of Sunnyvale, Calif.

The storage system may be configured to operate according to a client/server model of information delivery to thereby allow many clients to access the directories, files and blocks stored on the system. In this model, the client may comprise an application, such as a database application, executing on a computer that "connects" to the storage system over a computer network, such as a point-to-point link, shared local area network, wide area network or virtual private network implemented over a public network, such as the Internet. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

Each storage system typically includes a root volume that is utilized by the storage operating system to store software executables and configuration information needed to initialize the system. The storage system may further utilize one or more virtual (or flexible) volumes contained within an aggregate comprising a plurality of disks, wherein the logical organization of data is associated with the flexible volumes and the physical organization of storage devices is associated with the aggregate. Flexible (virtual) volumes and aggregates are described in U.S. patent application Ser. No. 10/836,817 entitled EXTENSION OF WRITE ANYWHERE FILE SYSTEM LAYOUT, by John K. Edwards, et al. In such a storage system, one of the flexible volumes is designated as the root volume for purposes of system initialization, storing configuration, etc.

A noted disadvantage of a conventional storage system arises when the root volume of an aggregate is missing or corrupted, which results in the storage operating system being unable to initialize the system. That is, without a functional root volume, the storage system is unable to complete its initialization until such time as a set of physical storage devices containing an aggregate and associated root volume is available and operational. Alternately, an administrator may be required to enter a minimal, e.g., maintenance, mode of the storage operating system to manually assign and aggregate disks and/or disk extents to form a root volume so that the storage operating system may complete its initialization process.

SUMMARY OF THE INVENTION

The disadvantages of the prior art are overcome by providing a system and method for automatic root volume creation in a storage system. During initialization, a storage operating system of the storage system is configured to determine whether a root volume is available and operational within the system. If not, the storage operating system automatically invokes a root volume generation process to create a flexible root volume within a root aggregate of the storage system. Illustratively, the created root volume is sized to a minimum size allowable by a file system of the storage operating system and, to that end, is implemented using thin provisioning. The use of thin provisioning ensures that the amount of physical space occupied by the root volume is minimized to thereby increase the probability that there is sufficient space within the aggregate to store the volume.

Specifically, the root volume generation process automatically creates a thinly provisioned flexible volume of the minimum size allowable and then asserts a flag within a flexible volume descriptor file associated with the flexible volume to identify the created flexible volume as a root volume for the storage system. Upon completion of the root volume generation process, the storage operating system uses the created root volume to initialize the storage system to at least a functional level. Such functional level initialization enables an administrator to correct any error condition that damaged the original root volume and/or restore appropriate configuration information to the storage operating system.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage System Environment

Figure 1:
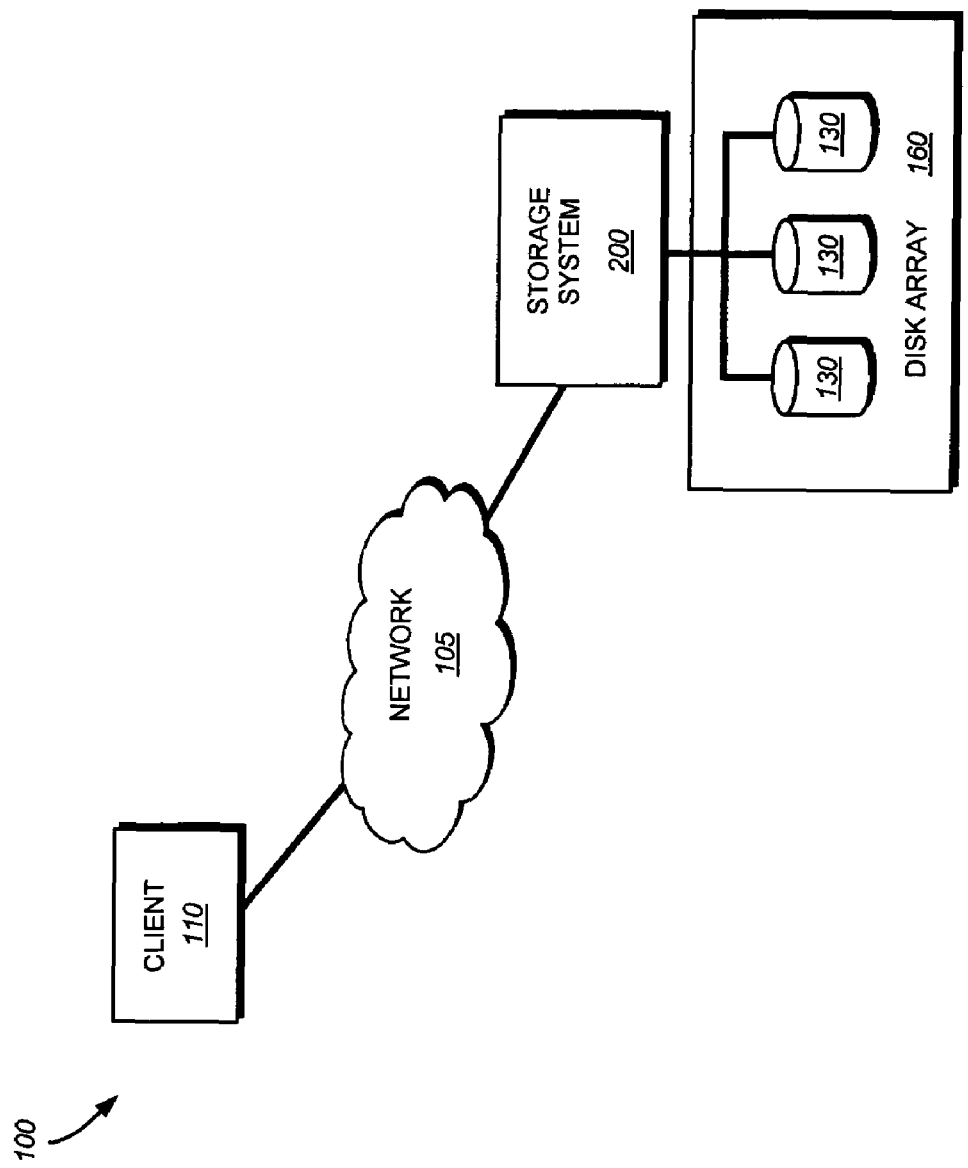
FIG. 1 is a schematic block diagram of an exemplary network storage system environment in accordance with an embodiment of the present invention.

FIG. 1 is a schematic block diagram of an exemplary storage system environment 100 in accordance with an embodiment of the present invention. The storage system environment 100 comprises of a storage system 200 operatively interconnected with one or more storage devices 130, such as disks. The disks 130 are illustratively organized into one or more disk arrays 160. A computer network 105 connects the storage system 200 with one or more clients 110. The network 105 may comprise any suitable internetworking arrangement including, for example, a local area network (LAN), wide area network (WAN), virtual private network (VPN), etc. Additionally, the network 105 may utilize any form of transport media including, for example, Ethernet and/or Fibre Channel (FC). The client may comprise any form of computer that interfaces with the storage system including, for example, an application server.

B. Storage System

Figure 2:
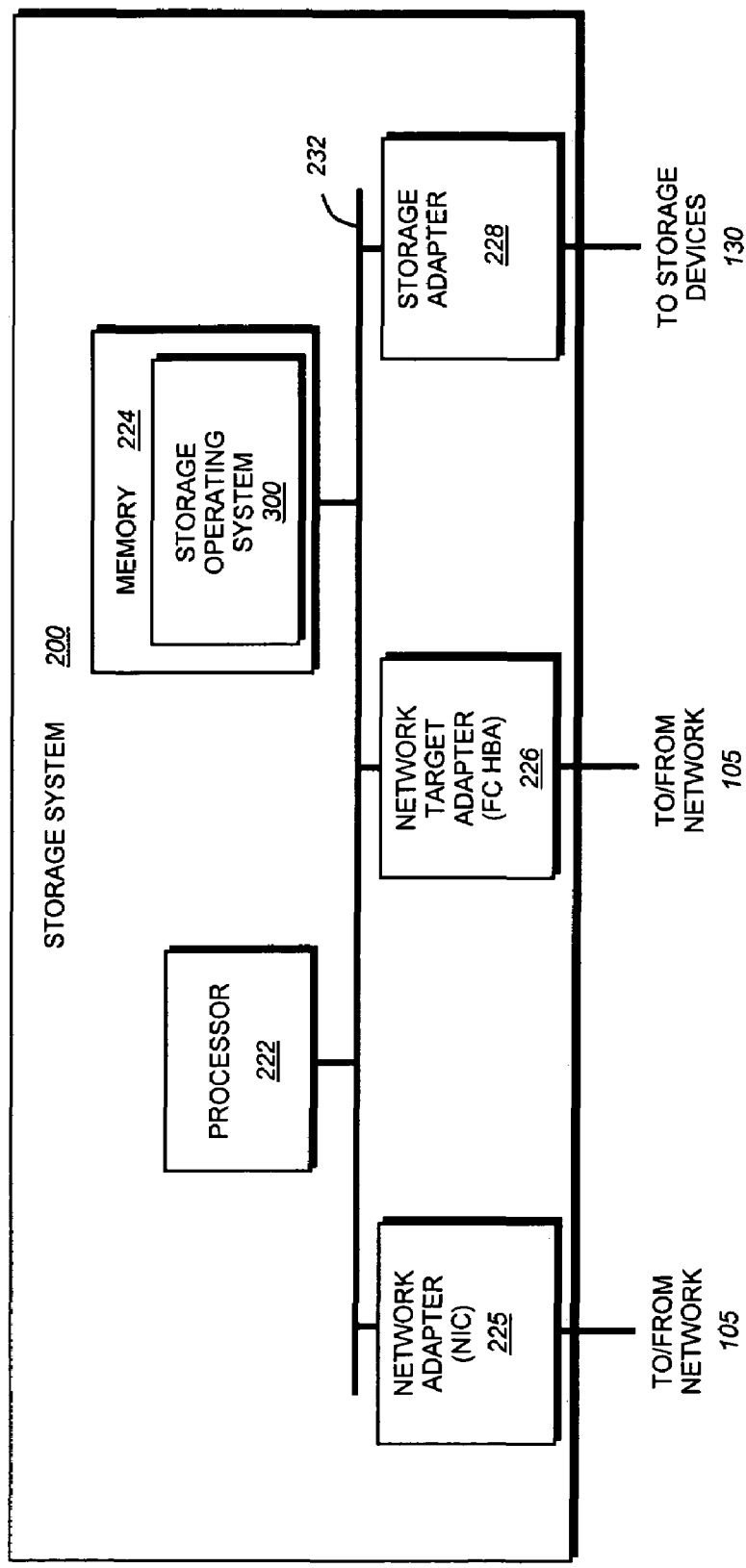
FIG. 2 is a schematic block diagram of an exemplary storage system in accordance with an embodiment of the present invention.

FIG. 2 is a schematic block diagram of an illustrative storage system 200 that may be advantageously used with the present invention. The storage system is configured to provide storage service for both file and block protocol access to information stored on storage devices in an integrated manner. In this context, the storage system may be embodied as a storage appliance, which denotes a computer having features such as simplicity of storage service management and ease of storage reconfiguration, including reusable storage space, for users (system administrators) and clients of network attached storage (NAS) and storage area network (SAN) deployments.

The storage system 200 illustratively comprises a processor 222, a memory 224, a plurality of network adapters 225, 226 and a storage adapter 228 interconnected by a system bus 232. The storage system also includes a storage operating system 300 that provides a virtualization system (and, in particular, a file system) to logically organize the information as a hierarchical structure of named data containers, such as directory, file and virtual disk (vdisk) storage objects on storage devices, such as disks.

Whereas clients of a NAS-based network environment have a storage viewpoint of files, the clients of a SAN-based network environment have a storage viewpoint of blocks or disks. To that end, the storage system 200 presents (exports) disks to SAN clients through the creation of logical unit numbers (luns) or vdisk objects. A vdisk object (hereinafter "vdisk") is a special file type that is implemented by the virtualization system and translated into an emulated disk as viewed by the SAN clients. The storage system thereafter makes these emulated disks accessible to the SAN clients through controlled exports.

In the illustrative embodiment, the memory 224 comprises storage locations that are addressable by the processor and adapters for storing software program code and data structures associated with the present invention. A portion of memory 224 may be organized as a "buffer cache" for storing data structures for use by the storage operating system during runtime operation. The processor and adapters may, in turn, comprise processing elements and/or logic circuitry configured to execute the software code and manipulate the data structures. The storage operating system 300, portions of which is typically resident in memory and executed by the processing elements, functionally organizes the storage system by, inter alia, invoking storage operations in support of the storage service implemented by the storage system. It will be apparent to those skilled in the art that other processing and memory means, including various computer readable media, may be used for storing and executing program instructions pertaining to the invention described herein.

The network adapter 225 may comprise a network interface controller (NIC) that couples the storage system to one or more clients over point-to-point links, wide area networks, virtual private networks implemented over a public network (Internet) or a shared local area network. The NIC comprises the mechanical, electrical and signaling circuitry needed to connect the system to a network. In addition, the storage network "target" adapter 226 couples the storage system to clients that may be further configured to access the stored information as blocks or disks. The network target adapter 226 may comprise a FC host bus adapter (HBA) having the mechanical, electrical and signaling circuitry needed to connect the system to a SAN network switch. In addition to providing FC access, the FC HBA may offload fibre channel network processing operations for the storage system.

The storage adapter 228 cooperates with the storage operating system 300 executing on the storage system to access information requested by the clients. The information may be stored on disks or other similar media adapted to store information. The storage adapter includes I/O interface circuitry that couples to the disks 130 over an I/O interconnect arrangement, such as a conventional high-performance, FC serial link topology. The information is retrieved by the storage adapter and, if necessary, processed by the processor 222 (or the adapter 228 itself) prior to being forwarded over the system bus 232 to the network adapters 225, 226, where the information is formatted into packets or messages and returned to the clients.

Storage of information on the storage system 200 is preferably implemented as one or more storage volumes that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

One or more virtual disks (vdisks) may be stored within each volume. A vdisk is a special file type in a volume that derives from a plain (regular) file, but that has associated export controls and operation restrictions that support emulation of a disk. In the illustrative embodiment, a vdisk is a multi-inode object comprising a special file inode and a set of stream inodes that are managed as a single, encapsulated storage object within the file system of the storage system. As used herein, a set of stream inodes denotes one or more stream inodes. The vdisk illustratively manifests as an embodiment of a stream inode that, in cooperation with the special file inode, creates a new type of file storage object having the capacity to encapsulate specific security, management and addressing (export) information. A vdisk is, thus, an encapsulated data container comprising a data section and one or more metadata sections that may be stored in streams associated with the data section. An example of a stream inode object that may be advantageously used with the present invention is described in U.S. Pat. No. 6,643,654 titled SYSTEM AND METHOD FOR REPRESENTING NAMED DATA STREAMS WITHIN AN ON-DISK STRUCTURE OF A FILE SYSTEM, by Kayuri Patel et al.

C. Storage Operating System

To facilitate access to the disks, the storage operating system 300 implements a write-anywhere file system that cooperates with virtualization modules to provide a function that "virtualizes" the storage space provided by disks. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN system approach to storage by enabling file-based (NAS) access to the files and directories, while further enabling block-based (SAN) access to the vdisks on a file-based storage platform.

In the illustrative embodiment, the storage operating system is preferably the NetApp® Data ONTAP™ operating system available from Network Appliance, Inc., Sunnyvale, Calif. that implements a Write Anywhere File Layout (WAFL®) file system. However, it is expressly contemplated that any appropriate storage operating system, including a write in-place file system, may be enhanced for use in accordance with the inventive principles described herein. As such, where the term "ONTAP" is employed, it should be taken broadly to refer to any storage operating system that is otherwise adaptable to the teachings of this invention.

As used herein, the term "storage operating system" generally refers to the computer-executable code operable on a computer that manages data access and may, in the case of a storage system, implement data access semantics, such as the Data ONTAP storage operating system, which is implemented as a microkernel. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
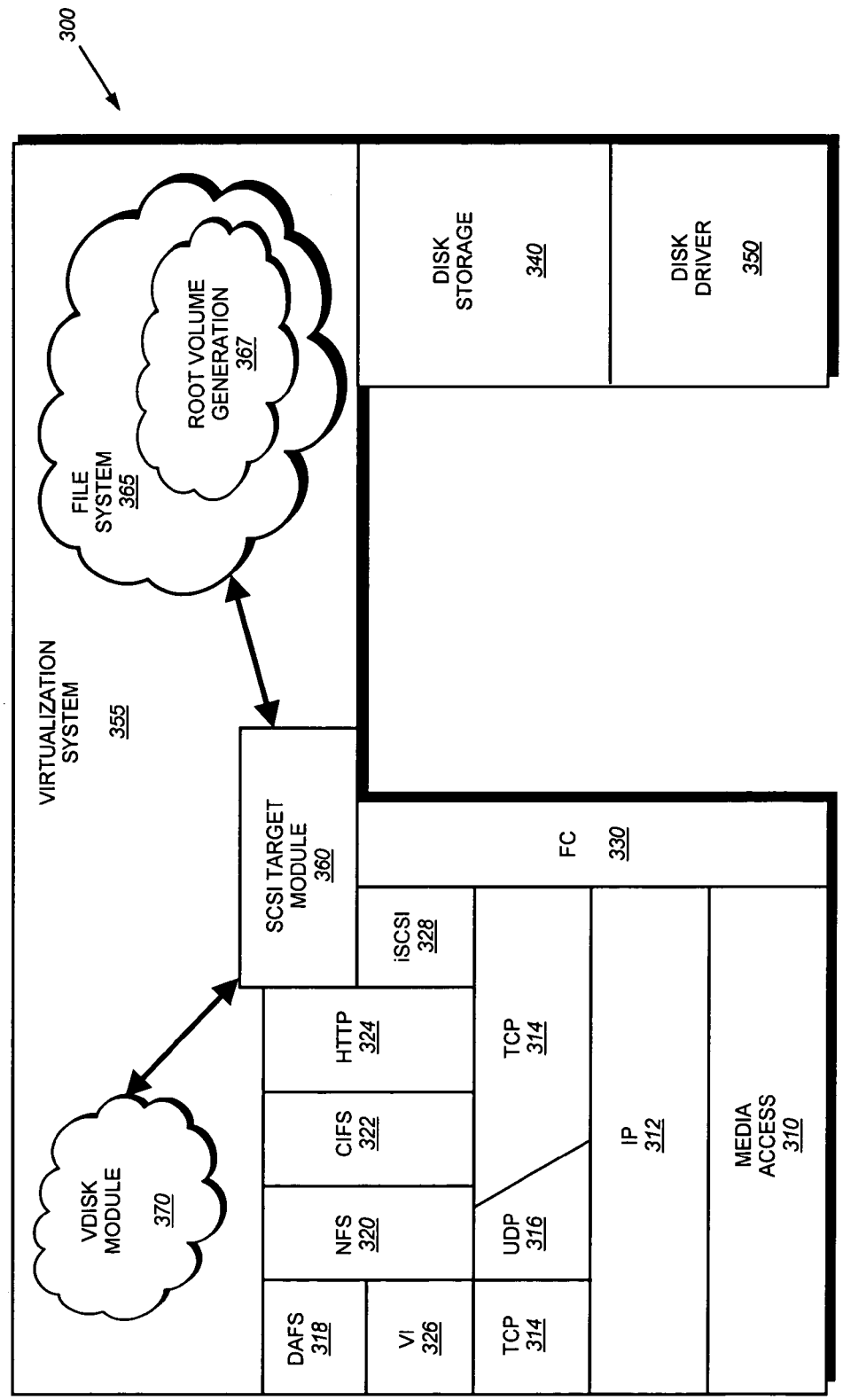
FIG. 3 is a schematic block diagram of an exemplary storage operating system for use on a storage system in accordance with an embodiment of the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine that provides data paths for clients to access information stored on the multi-protocol storage system using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the DAFS protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318.

An iSCSI driver layer 328 provides block protocol access over the TCP/IP network protocol layers, while a FC driver layer 330 operates with the FC HBA 226 to receive and transmit block access requests and responses to and from the integrated storage system. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage system. In addition, the storage operating system includes a disk storage layer 340, such as a RAID system, that implements a disk storage protocol, such as a RAID protocol, and a disk driver layer 350 that implements a disk access protocol such as, e.g., a SCSI protocol.

Bridging the disk software layers with the integrated network protocol stack layers is a virtualization system 355 that is implemented by a file system 365 interacting with virtualization modules illustratively embodied as, e.g., vdisk module 370 and SCSI target module 360. It should be noted that the vdisk module 370, the file system 365 and SCSI target module 360 can be implemented in software, hardware, firmware, or a combination thereof. The vdisk module 370 interacts with the file system 365 to enable access by administrative interfaces in response to a system administrator issuing commands to the multi-protocol storage system 200. In essence, the vdisk module 370 manages SAN deployments by, among other things, implementing a comprehensive set of vdisk (lun) commands issued through a user interface by a system administrator. These vdisk commands are converted to primitive file system operations ("primitives") that interact with the file system 365 and the SCSI target module 360 to implement the vdisks.

The SCSI target module 360, in turn, initiates emulation of a disk or lun by providing a mapping procedure that translates luns into the special vdisk file types. The SCSI target module is illustratively disposed between the FC and iSCSI drivers 330, 328 and the file system 365 to thereby provide a translation layer of the virtualization system 355 between the SAN block (lun) space and the file system space, where luns are represented as vdisks. By "disposing" SAN virtualization over the file system 365, the multi-protocol storage system reverses the approaches taken by prior systems to thereby provide a single unified storage platform for essentially all storage access protocols.

The file system 365 is illustratively a message-based system; as such, the SCSI target module 360 transposes a SCSI request into a message representing an operation directed to the file system. For example, the message generated by the SCSI target module may include a type of operation (e.g., read, write) along with a pathname (e.g., a path descriptor) and a filename (e.g., a special filename) of the vdisk object represented in the file system. The SCSI target module 360 passes the message into the file system 365 as, e.g., a function call, where the operation is performed.

The file system 365 illustratively implements the WAFL file system having an on-disk format representation that is block-based using, e.g., 4 kilobyte (KB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk. A description of the structure of the file system, including on-disk inodes and the inode file, is provided in the U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al.

As described herein, the file system 365 includes a root volume generation process 367 configured to automatically create a root volume in accordance with the present invention.

It should be noted that in alternate embodiments, the functionality of the root volume generation process 367 may be implemented in other modules of the storage operating system. Additionally, the functionality may be implemented in boot firmware (not shown). As such, the description of the root volume generation process 367 being within the file system 365 should be taken as exemplary only.

Operationally, a request from the client 110 is forwarded as a packet over the computer network 105 and onto the storage system 200 where it is received at the network adapter 225, 226. A network driver processes the packet and, if appropriate, passes it on to a network protocol and file access layer for additional processing prior to forwarding to the write-anywhere file system 365. Here, the file system generates operations to load (retrieve) the requested data from disk 130 if it is not resident "in-core," i.e., in the buffer cache. If the information is not in the cache, the file system 365 indexes into the inode file using the inode number to access an appropriate entry and retrieve a logical volume block number (vbn). The file system then passes a message structure including the logical vbn to the RAID system 340; the logical vbn is mapped to a disk identifier and disk block number (disk,dbn) and sent to an appropriate driver (e.g., SCSI) of the disk driver system 350. The disk driver accesses the dbn from the specified disk 130 and loads the requested data block(s) in buffer cache for processing by the storage system. Upon completion of the request, the storage system (and operating system) returns a reply to the client 110 over the network 105.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 200 in response to a request issued by client 110. Moreover, in another alternate embodiment of the invention, the processing elements of adapters 225, 226, may be configured to offload some or all of the packet processing and storage access operations, respectively, from processor 222, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., file server, filer or storage system) or general-purpose computer, including a standalone computer or portion thereof, embodied as or including a storage system 200. An example of a storage system that may be advantageously used with the present invention is described in U.S. patent application Ser. No. 10/215,917 titled, MULTI-PROTOCOL STORAGE APPLIANCE THAT PROVIDES INTEGRATED SUPPORT FOR FILE AND BLOCK ACCESS PROTOCOLS, by Brian Pawlowski, et al., filed on Aug. 8, 2002. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

D. File System Organization

Figure 4:
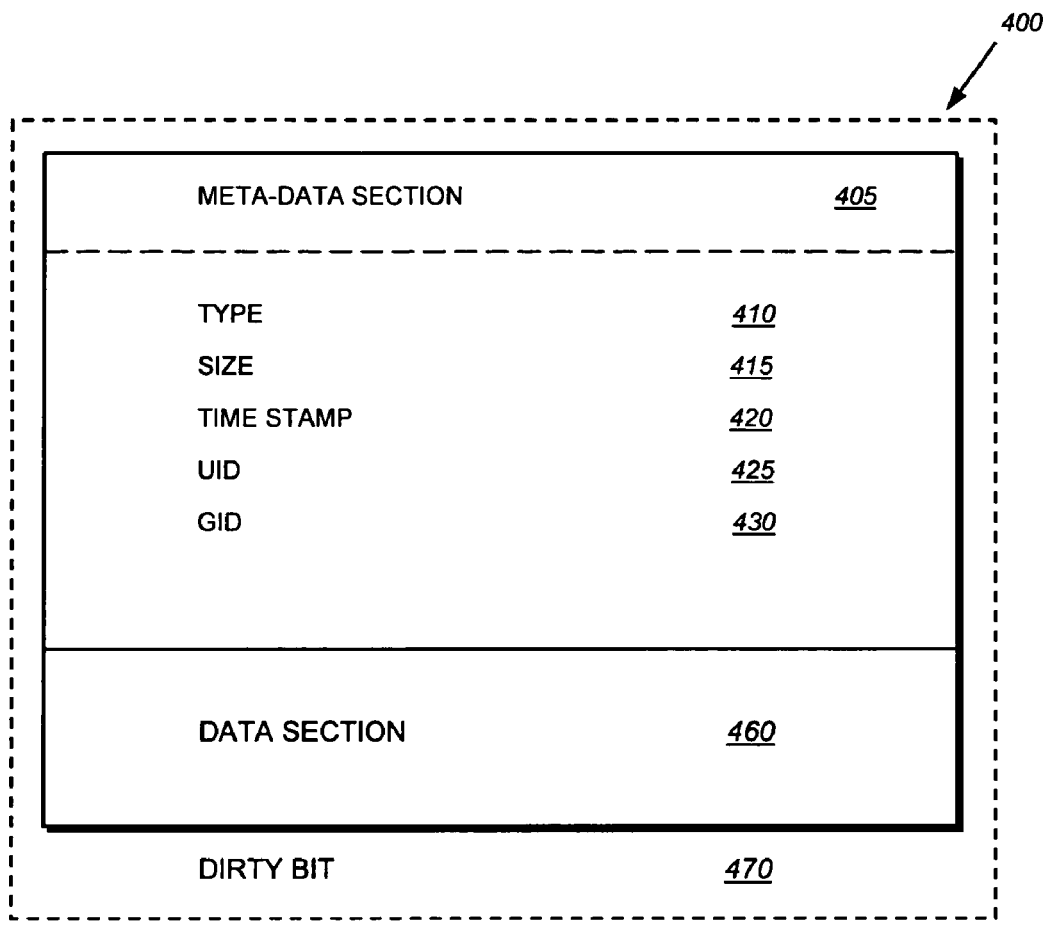
FIG. 4 it is a schematic block diagram of an exemplary inode in accordance with an embodiment of the present invention.

In the illustrative embodiment, a data container, such as a file, vdisk, etc., is represented in the write-anywhere file system as an inode data structure adapted for storage on the disks 130. FIG. 4 is a schematic block diagram of an inode 400, which preferably includes a meta-data section 405 and a data section 460. The information stored in the meta-data section 405 of each inode 400 describes the data container (e.g., a file) and, as such, includes the type (e.g., regular, directory, vdisk) 410 of file, its size 415, time stamps (e.g., access and/or modification time) 420 and ownership, i.e., user identifier (UID 425) and group ID (GID 430), of the file. The contents of the data section 460 of each inode may be interpreted differently depending upon the type of file (inode) defined within the type field 410. For example, the data section 460 of a directory inode contains meta-data controlled by the file system, whereas the data section of a regular inode contains file system data. In this latter case, the data section 460 includes a representation of the data associated with the file.

Specifically, the data section 460 of a regular on-disk inode may include file system data or pointers, the latter referencing 4 KB data blocks on disk used to store the file system data. Each pointer is preferably a logical vbn to facilitate efficiency among the file system and the RAID system 340 when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 460 of the inode (e.g., a second level inode) references an indirect block (e.g., a first level L1 block) that contains 1024 pointers, each of which references a 4 KB data block on disk. For file system data having a size greater than 64 MB, each pointer in the data section 460 of the inode (e.g., a third level L3 inode) references a double-indirect block (e.g., a second level L2 block) that contains 1024 pointers, each referencing an indirect (e.g., a first level L1) block. The indirect block, in turn, that contains 1024 pointers, each of which references a 4 KB data block on disk. When accessing a file, each block of the file may be loaded from disk 130 into the memory 224.

When an on-disk inode (or block) is loaded from disk 130 into memory 224, its corresponding in-core structure embeds the on-disk structure. For example, the dotted line surrounding the inode 400 indicates the in-core representation of the on-disk inode structure. The in-core structure is a block of memory that stores the on-disk structure plus additional information needed to manage data in the memory (but not on disk). The additional information may include, e.g., a "dirty" bit 470. After data in the inode (or block) is updated/modified as instructed by, e.g., a write operation, the modified data is marked "dirty" using the dirty bit 470 so that the inode (block) can be subsequently "flushed" (stored) to disk. The in-core and on-disk format structures of the WAFL file system, including the inodes and inode file, are disclosed and described in U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al., issued on Oct. 6, 1998.

Figure 5:
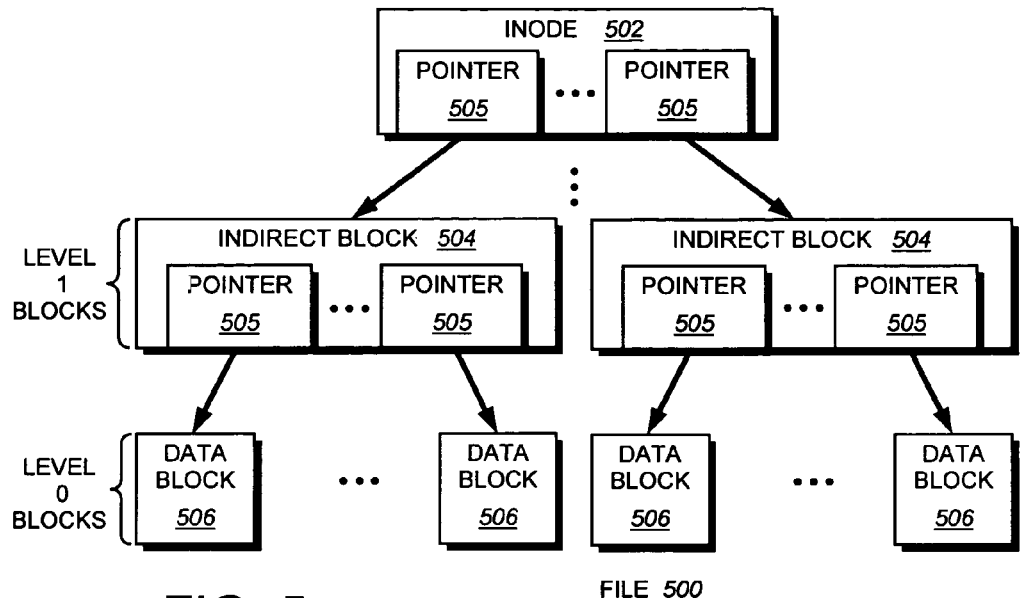
FIG. 5 is a schematic block diagram of a first exemplary buffer tree in accordance with an embodiment of the present invention.

FIG. 5 is a schematic block diagram of an embodiment of a buffer tree of a file that may be advantageously used with the present invention. The buffer tree is an internal representation of blocks for a file (e.g., file 500) loaded into the memory 224 and maintained by the write-anywhere file system 365. A root (top-level) inode 502, such as an embedded inode, references indirect (e.g., level 1) blocks 504. Note that there may be additional levels of indirect blocks (e.g., level 2, level 3) depending upon the size of the file. The indirect blocks (and inode) contain pointers 505 that ultimately reference data blocks 506 used to store the actual data of the file. That is, the data of file 500 are contained in data blocks and the locations of these blocks are stored in the indirect blocks of the file. Each level 1 indirect block 504 may contain pointers to as many as 1024 data blocks. According to the "write anywhere" nature of the file system, these blocks may be located anywhere on the disks 130.

A file system layout is provided that apportions an underlying physical volume into one or more virtual volumes (or flexible volume) of a storage system. An example of such a file system layout is described in the above-incorporated U.S. patent application Ser. No. 10/836,817 titled EXTENSION OF WRITE ANYWHERE FILE SYSTEM LAYOUT, by John K. Edwards, et al. The underlying physical volume is an aggregate comprising one or more groups of disks, such as RAID groups. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 500) stored in a flexible volume. This "hybrid" flexible volume embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

Figure 6:
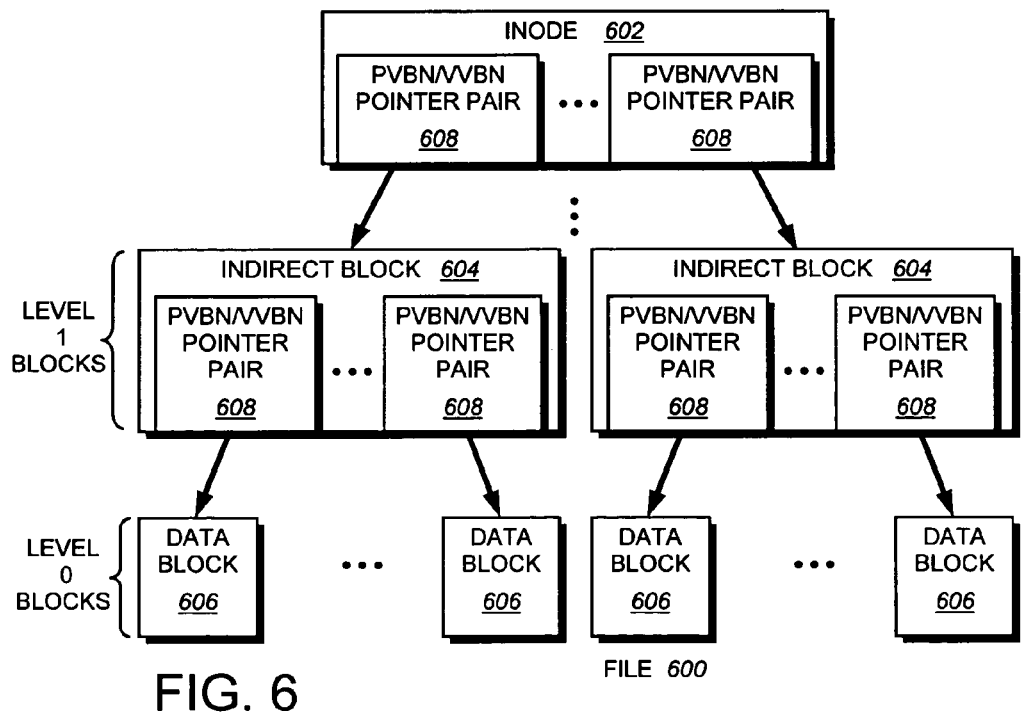
FIG. 6 is a schematic block diagram of a second exemplary buffer tree in accordance with an embodiment of the present invention.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks. FIG. 6 is a schematic block diagram of an illustrative embodiment of a buffer tree of a file 600 that may be advantageously used with the present invention. A root (top-level) inode 602, such as an embedded inode, references indirect (e.g., level 1) blocks 604. Note that there may be additional levels of indirect blocks (e.g., level 2, level 3) depending upon the size of the file. The indirect blocks (and inode) contain pvbn/vvbn pointer pair structures 608 that ultimately reference data blocks 606 used to store the actual data of the file.

The pvbns reference locations on disks of the aggregate, whereas the vvbns reference locations within files of the flexible volume. The use of pvbns as block pointers 608 in the indirect blocks 604 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 7:
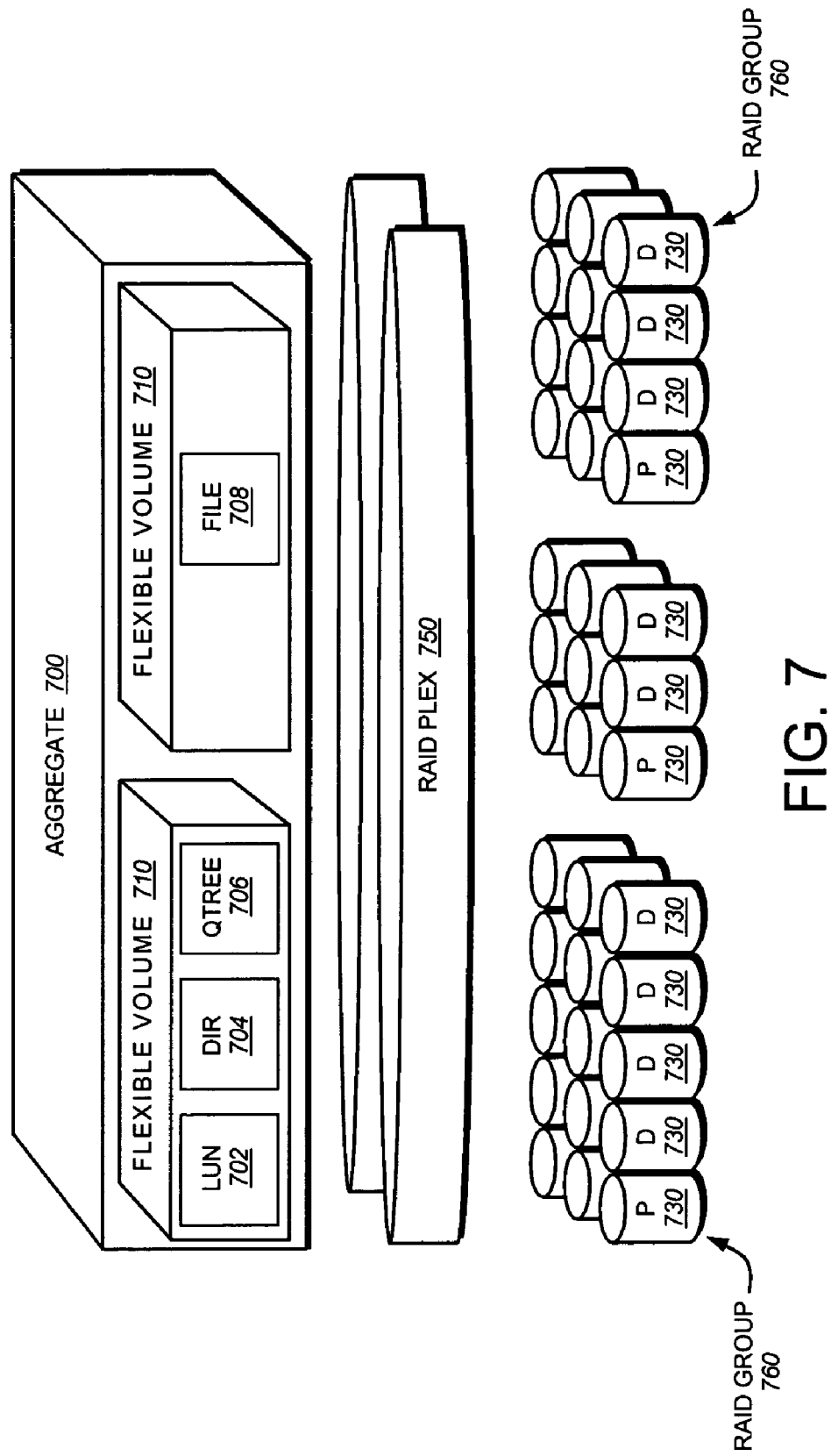
FIG. 7 is a schematic block diagram of an aggregate in accordance with an embodiment of the present invention.

FIG. 7 is a schematic block diagram of an embodiment of an aggregate 700 that may be advantageously used with the present invention. Luns (blocks) 702, directories 704, qtrees 706 and files 708 may be contained within flexible volumes 710, such as dual vbn flexible volumes, that, in turn, are contained within the aggregate 700. The aggregate 700 is illustratively layered on top of the RAID system, which is represented by at least one RAID plex 750 (depending upon whether the storage configuration is mirrored), wherein each plex 750 comprises at least one RAID group 760. Each RAID group further comprises a plurality of disks 730, e.g., one or more data (D) disks and at least one (P) parity disk.

Whereas the aggregate 700 is analogous to a physical volume of a conventional storage system, a flexible volume is analogous to a file within that physical volume. That is, the aggregate 700 may include one or more files, wherein each file contains a flexible volume 710 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 710 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem file, flexible volume descriptor file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a flexible volume descriptor file. The flexible volume descriptor file is illustratively a 4 KB file that contains metadata similar to that stored in a conventional raid label. In other words, the flexible volume descriptor file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 8:
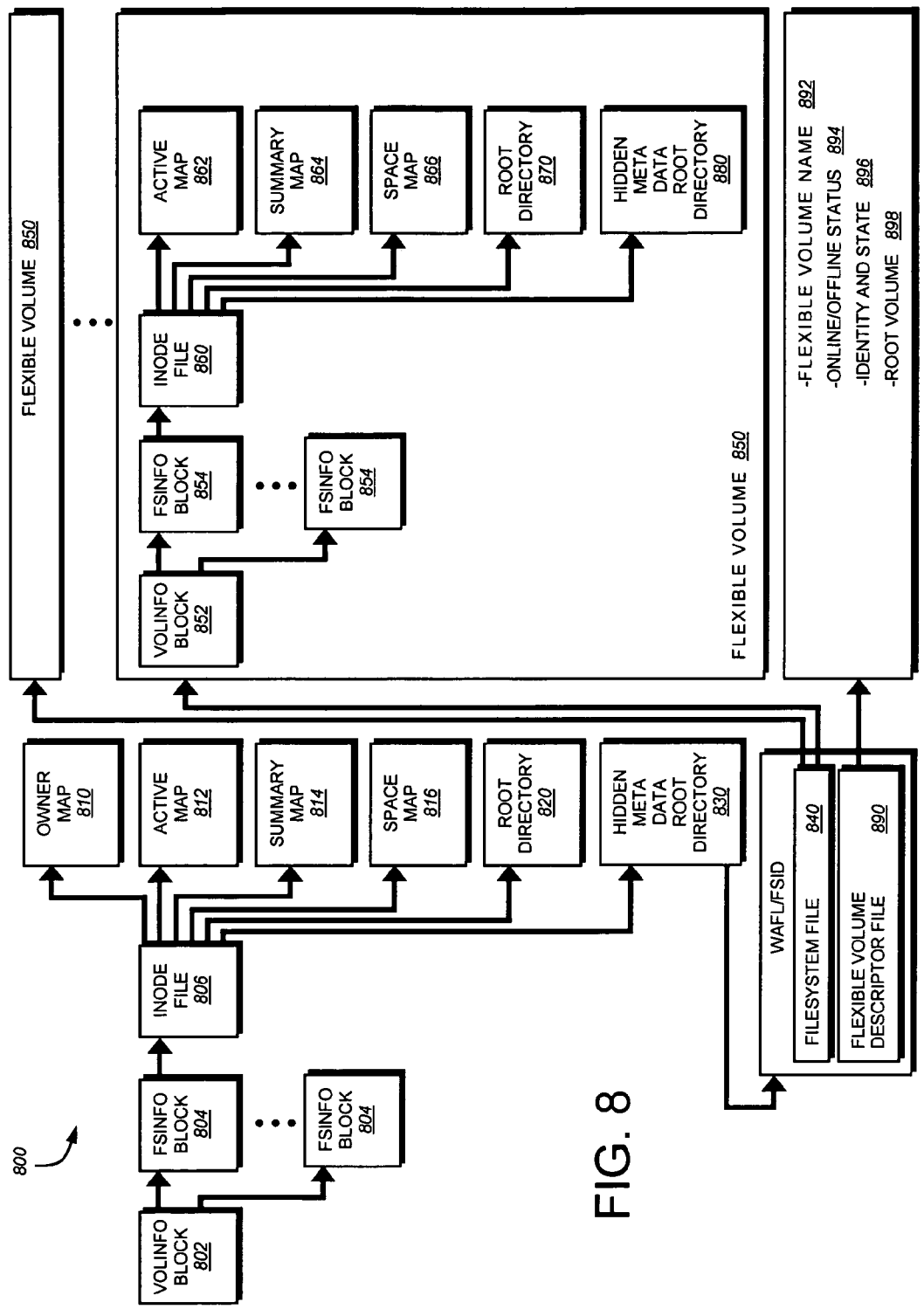
FIG. 8 is a schematic block diagram of an on-disk structure of an aggregate and flexible volume in accordance with an embodiment of the present invention.

FIG. 8 is a schematic block diagram of an on-disk representation of an aggregate 800. The storage operating system 300, e.g., the RAID system 340, assembles a physical volume of pvbns to create the aggregate 800, with pvbns 1 and 2 comprising a "physical" volinfo block 802 for the aggregate. The volinfo block 802 contains block pointers to fsinfo blocks 804, each of which may represent a snapshot of the aggregate. Each fsinfo block 804 includes a block pointer to an inode file 806 that contains inodes of a plurality of files, including an owner map 810, an active map 812, a summary map 814 and a space map 816, as well as other special meta-data files. The inode file 806 further includes a root directory 820 and a "hidden" meta-data root directory 830, the latter of which includes a namespace having files related to a flexible volume in which users cannot "see" the files. The hidden meta-data root directory includes the WAFL/fsid/directory structure that contains filesystem file 840 and flexible volume descriptor file 890. Note that root directory 820 in the aggregate is empty; all files related to the aggregate are organized within the hidden meta-data root directory 830.

In addition to being embodied as a container file having level 1 blocks organized as a container map, the filesystem file 840 includes block pointers that reference various file systems embodied as flexible volumes 850. The aggregate 800 maintains these flexible volumes 850 at special reserved inode numbers. Each flexible volume 850 also has special reserved inode numbers within its flexible volume space that are used for, among other things, the block allocation bitmap structures. As noted, the block allocation bitmap structures, e.g., active map 862, summary map 864 and space map 866, are located in each flexible volume.

Specifically, each flexible volume 850 has the same inode file structure/content as the aggregate, with the exception that there is no owner map and no WAFL/fsid/filesystem file, flexible volume descriptor file directory structure in a hidden meta-data root directory 880. To that end, each flexible volume 850 has a volinfo block 852 that points to one or more fsinfo blocks 854, each of which may represent a snapshot, along with the active file system of the flexible volume. Each fsinfo block, in turn, points to an inode file 860 that, as noted, has the same inode structure/content as the aggregate with the exceptions noted above. Each flexible volume 850 has its own inode file 860 and distinct inode space with corresponding inode numbers, as well as its own root (fsid) directory 870 and subdirectories of files that can be exported separately from other flexible volumes.

The flexible volume descriptor file 890 contained within the hidden meta-data root directory 830 of the aggregate is a small file that functions as an analog to a conventional raid label. A raid label includes physical information about the storage system, such as the volume name; that information is loaded into the flexible volume descriptor file 890. Illustratively, the flexible volume descriptor file 890 includes the name 892 of the associated flexible volume 850, the online/offline status 894 of the flexible volume, and other identity and state information 896 of the associated flexible volume (whether it is in the process of being created or destroyed)

including, in an aspect of the present invention, a root volume field (e.g., root volume flag 898) identifying whether the flexible volume is the root volume.

E. Thin Provisioning of Data Containers

Certain file systems, including the exemplary WAFL file system, include the capability to generate a thinly provisioned data container, wherein the data container is not completely written to disk at the time of its creation. As used herein, the term data container generally refers to a unit of storage for holding data, such as a file system, file, volume or a lun, which is addressable by, e.g., its own unique identification. The storage space required to hold the contents of the thinly provisioned data container on disk has not yet been used. The use of thinly provisioned data container is often utilized in the exemplary file system environment when, for example, a vdisk is initially generated. A user or administrator may generate a vdisk of specified size, for example, 10 gigabytes (GB), which size represents the maximum addressable space of the vdisk. To increase system performance, the file system generally does not write the entire vdisk contents to the disks at the time of creation. Instead, the file system generates a thinly provisioned data container (i.e., file) representing the vdisk. The thinly provisioned data container may then be populated (filled in) via subsequent write operations as the vdisk is filled in with data. While this description is written in terms of a thinly provisioned data container disposed over an underlying file system, it should be noted that other thin provisioning implementations may be utilized. As such, the use of an underlying file system to support a thinly provisioned data container should be taken as exemplary only.

Figure 9:
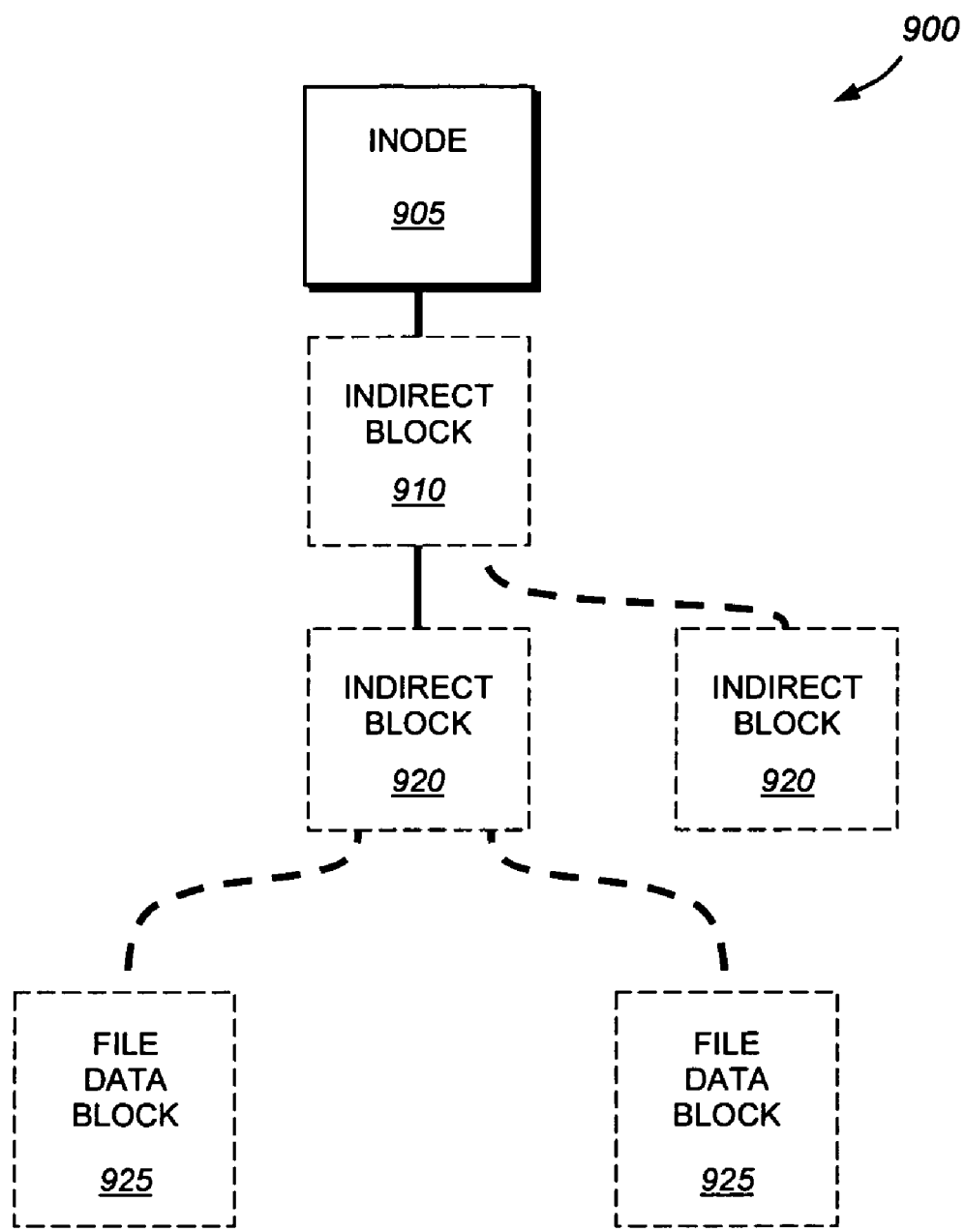
FIG. 9 is a schematic block diagram of an exemplary thinly provisioned data container in accordance with an embodiment of the present invention.

FIG. 9 is a schematic block diagram of an inode structure, i.e., a buffer tree 900, of an exemplary thinly provisioned data container. The (inode) buffer tree structure 900 is created when, for example, a vdisk is first created by the file system as thinly provisioned. In a typical thinly provisioned data container, only the inode 905 is actually written to disk. The remainder of the data container is not written to or otherwise physically stored on the disk(s) storing the data container. Although, the data container 900 includes a completed inode 905, it does not contain indirect blocks 910, 920 or file data blocks 925 (as shown in phantom). Thus, these phantom blocks (i.e., 910, 920, 925) are not generated when the data container is created, although they will be written to disk as the data container is populated. By only writing the inode to disk when a thinly provisioned data container is generated, substantial time is saved as the number of disk accesses is reduced. Additionally, only the storage space on the disks that is needed to hold the contents of the data container is utilized. Illustratively, the file system may make appropriate space reservations to ensure that the entire thinly provisioned data container may be written to disk. Space reservation techniques are described in U.S. patent application Ser. No. 10/423,391, entitled SYSTEM AND METHOD FOR RESERVING SPACE TO GUARANTEE FILE WRITABILITY IN A FILE SYSTEM SUPPORTING PERSISTENT CONSISTENCY POINT IMAGES, by Peter F. Corbett, et al.

Figure 10:
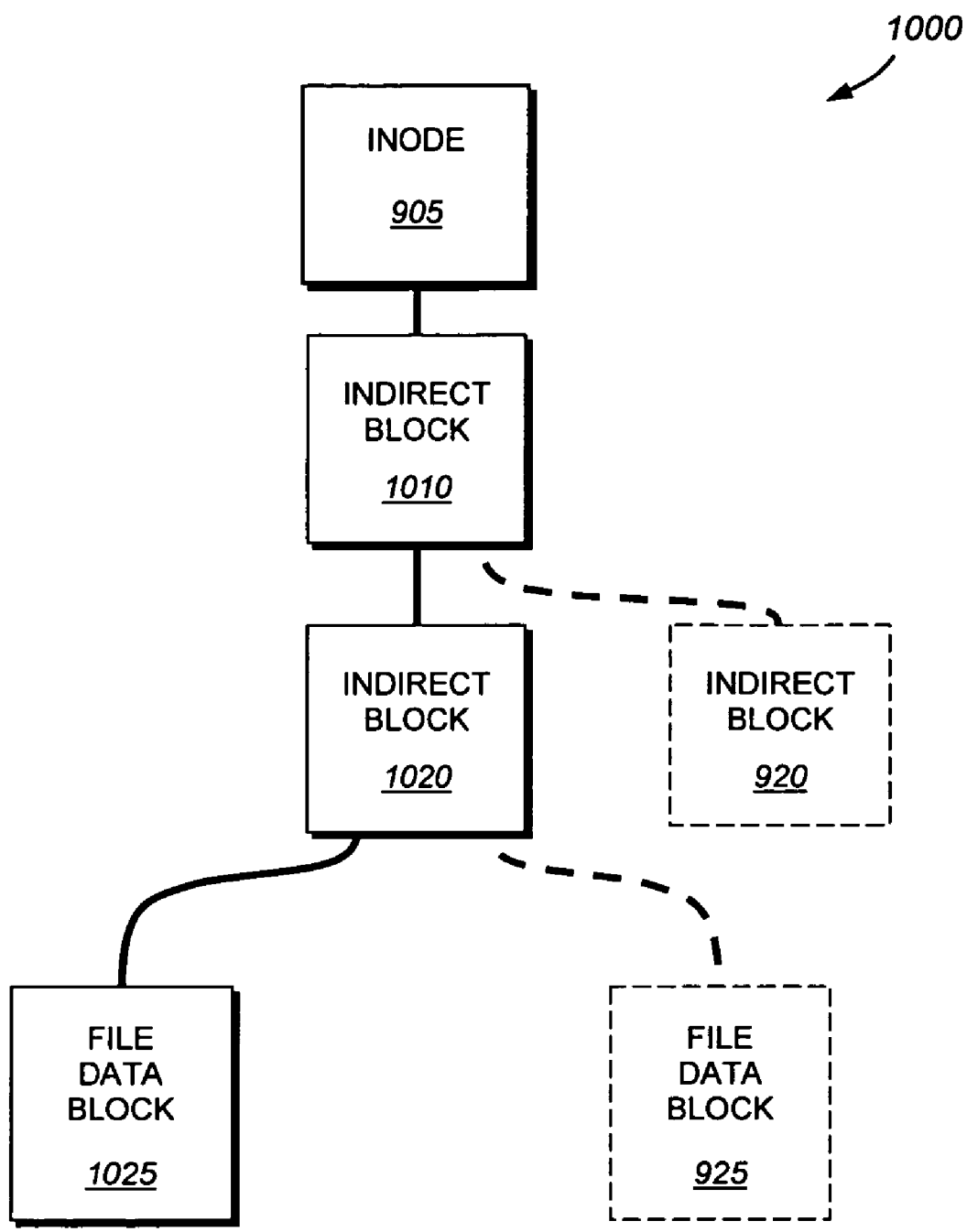
FIG. 10 is a schematic block diagram of an exemplary thinly provisioned data container after a first write operation in accordance with embodiment of the present invention.
Figure 11:
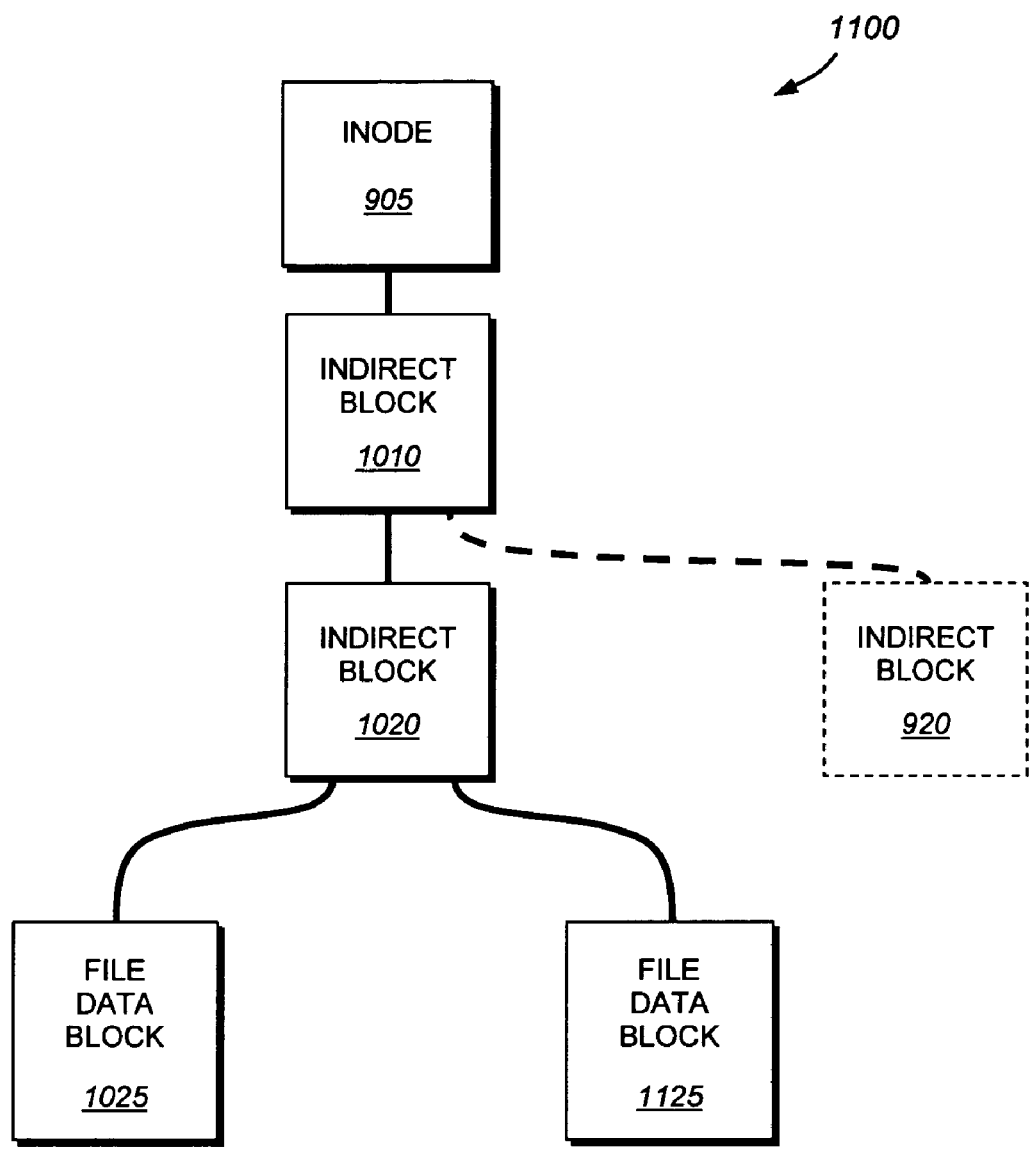
FIG. 11 is a schematic block diagram of an exemplary thinly provisioned data container after a second write operation in accordance with and bought in the present invention.
Figure 12:
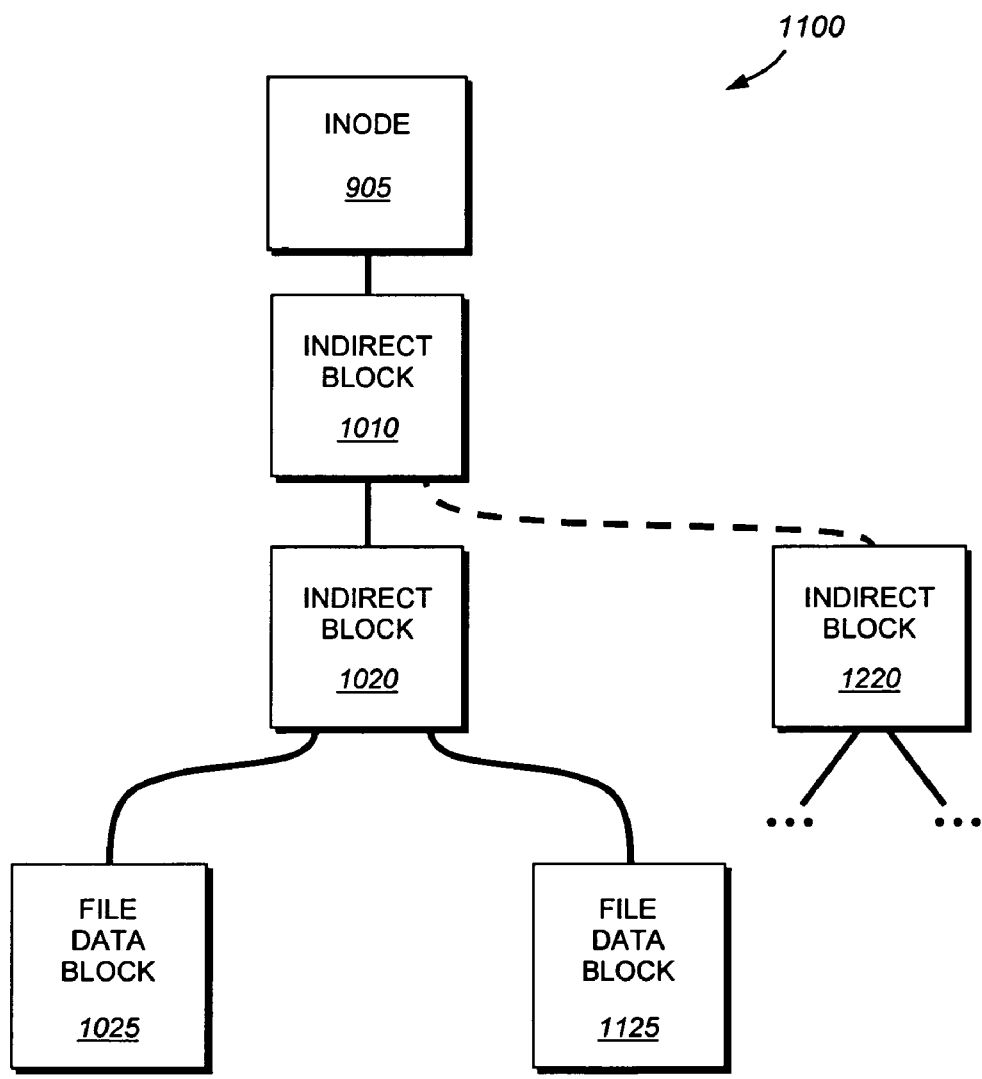
FIG. 12 is a schematic block diagram of an exemplary thinly provisioned data container after it has been fully written in accordance with an embodiment of the present invention.

FIG. 10 is a schematic block diagram of an exemplary (inode) buffer tree structure 1000 of a partially filled in thinly provisioned data container that includes original inode 905. Here, indirect blocks 1010, 1020 and exemplary file data block 1025 have been populated (filled in) in response to one or more write operations to the data container. Continued write operation results in filling in additional data blocks, for example, file data block 1125 as shown in the exemplary (inode) buffer tree structure 1100 of FIG. 11. Eventually, when the data container has been completely filled, all blocks, including such blocks as indirect blocks 1220 and associated file data blocks (not shown) will be completed as illustrated in the schematic block diagram of an exemplary inode structure 1200 in FIG. 12. At such time, the thinly provisioned data container has been completely filled in and each block is associated with an actual block on disk.

F. Automatic Root Volume Generation

The present invention is directed to a system and method for automatic root volume creation in a storage system, such as storage system 200. During initialization, the storage operating system 300 is configured to determine whether a root volume is available and operational within the system. If not, the storage operating system automatically invokes the root volume generation process 367 to create a flexible root volume, such as flexible volume 850, within a root aggregate, such as aggregate 800, of the storage system. Illustratively, the created root volume is sized to a minimum size allowable by file system 365 and, to that end, is implemented using thin provisioning. In the illustrative embodiment, this minimum size is 20 MB, however, in alternate embodiments, the minimum size may differ or there may be no minimum size for a volume in a particular file system. The use of thin provisioning ensures that the amount of physical space occupied by the root volume is minimized to thereby increase the probability that there is sufficient space within the aggregate to store the volume.

Specifically, the root volume generation process 367 automatically creates a thinly provisioned flexible volume of the minimum size allowable and then asserts a flag, such as root volume flag 898, within the flexible volume descriptor file 890 associated with the flexible volume to identify the created flexible volume as a root volume for the storage system. Upon completion of the root volume generation process, the storage operating system 300 uses the created root volume to initialize the storage system to at least a functional level. Such functional level initialization enables an administrator to correct any error condition that damaged the original root volume and/or restore appropriate configuration information to the storage operating system.

Figure 13:
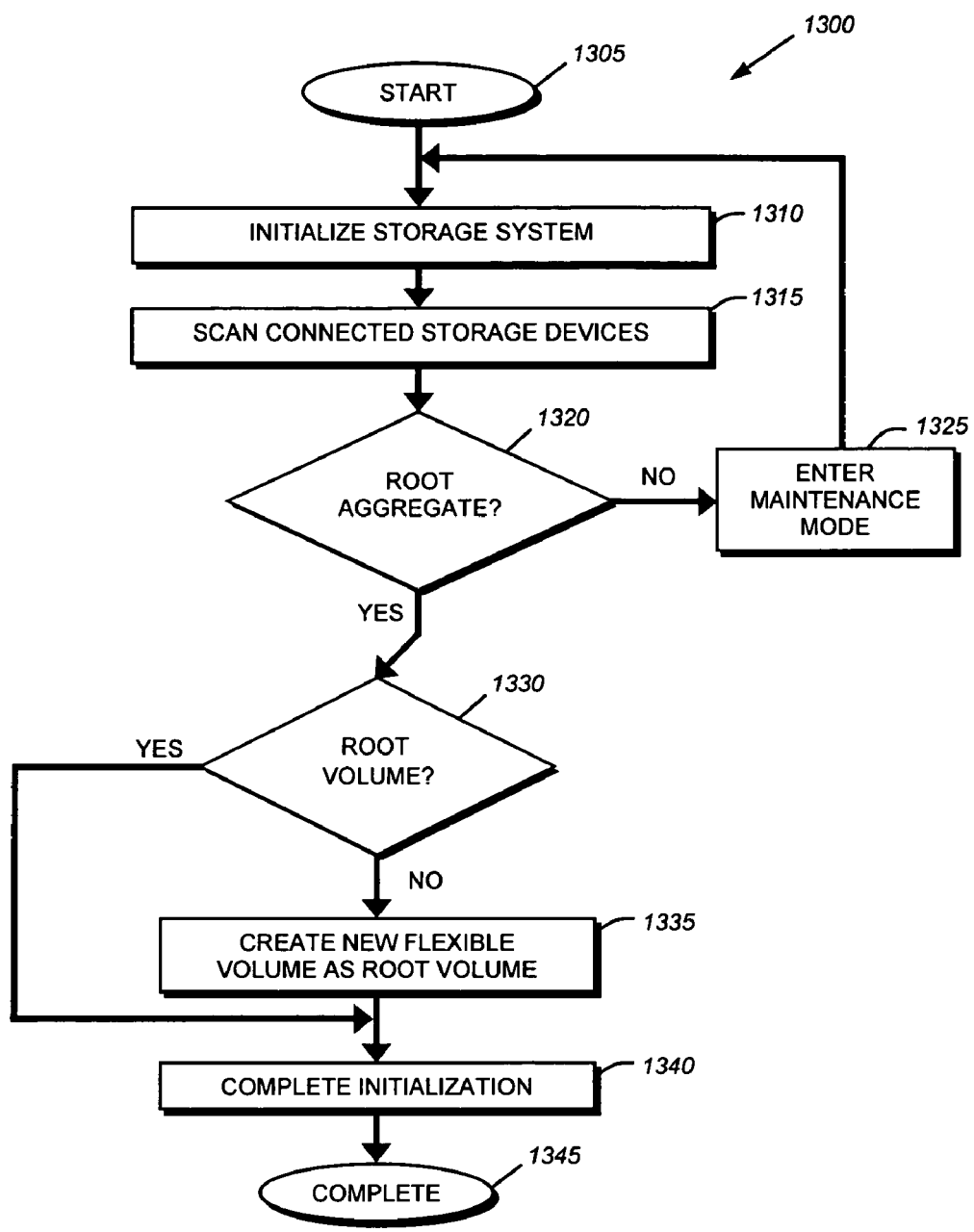
FIG. 13 is a flowchart detailing the steps of a procedure for automatic root volume creation in accordance with an embodiment of the present invention.

FIG. 13 is a flow chart detailing the steps of a procedure 1300 for automatically generating a root volume in accordance with an embodiment of the present invention. The procedure 1300 begins in step 1305 and continues to step 1310 where the storage system is initialized. Initialization may occur when, for example, power is first applied to the storage system (i.e., an initial boot up) or during a re-initialization sequence. During initialization, the storage operating system scans the connected storage devices, such as disks, to determine the configuration of aggregates and/or flexible volumes connected thereto. Various levels of the storage operating system, including the RAID system, assemble the disks into appropriate RAID groups and aggregates. In step 1320, the operating system determines whether any of the aggregates is identified as a root aggregate. The root aggregate is identified by examining all of the disks associated with the storage system to read RAID labels stored thereon. If none of the aggregates associated with the storage system is identified as a root aggregate, then the procedure branches to step 1325 where the storage operating system enters a maintenance mode. In maintenance mode, a system administrator must manually configure and/or select a new root aggregate. The storage system is then re-initialized in step 1310.

However, if there is a root aggregate (step 1320), the storage operating system determines in step 1330 whether there is an operational root volume stored in the root aggregate. If so, the procedure branches to step 1340 where the storage operating system completes the initialization and the procedure 1300 completes in step 1345. Note that if a root volume is available and operational, automatic generation of a root volume according to the teachings of the present invention is not required and the system may initialize using a conventional initialization sequence. However, if the root volume is not operational, the storage operating system invokes the root volume generation process 367 to automatically create and mark a new flexible volume as the root volume (step 1335). Illustratively, the new root volume is generated as a thinly provisioned volume of a minimum size. By establishing the new root volume as a thinly provisioned, minimally sized volume, the probability that there is sufficient space within the aggregate to store the newly created volume is increased. Once the new flexible root volume has been created, initialization completes in step 1340 and the procedure 1300 completes in step 1345.

It should be noted that, in the illustrative embodiment, although initialization may be completed with the thinly provisioned, minimally sized flexible root volume, the storage operating system operates in a reduced capabilities mode due to a lack of configuration files stored on the root volume. In an alternate embodiment, the root volume generation process 367 may be configured to repopulate the configuration files on the new root volume after it has created the volume. Such repopulation may occur by, for example, loading (onto the newly created root volume) a set of configuration files stored on a volume other than the root volume. In such an embodiment, the storage system may initialize into a full capability mode once the configuration files are loaded.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for creating a new root volume for a storage system, comprising:
    executing an initialization routine for the storage system, the initialization routine failing because no operational root volume is associated with the storage system; and
    creating a new root volume using a flexible volume, the flexible volume created with a minimum size allowable by the storage system to initialize the storage system.

2. The method of claim 1, further comprising:
    marking the created new root volume by asserting a root volume flag in a predetermined file associated with the created new root volume.

3. The method of claim 1, further comprising:
    thinly provisioning the created new root volume.

4. The method of claim 1, further comprising:
    completing initialization of the storage system using the created new root volume.

5. A system configured to create a new root volume for a storage system, the system comprising:
    means for executing an initialization routine for the storage system, the initialization routine failing because no operational root volume is associated with the storage system; and
    means for creating a new root volume using a flexible volume, the flexible volume created with a minimum size allowable by the storage system.

6. The system of claim 5, further comprising:
    the means for marking the created new root volume by asserting a root volume flag in a flexible volume descriptor file associated with the created new root volume.

7. The system of claim 5, further comprising:
    means for thinly provisioning the created new root volume.

8. The system of claim 5 further comprising:
    means for completing initialization of the storage system using the created new root volume.

9. A system configured to create a new root volume for a storage system, the system comprising:
    a root volume creating process configured to, upon detection that no operational root volume exists, create a new root volume using a flexible volume, the flexible volume created with a minimum size allowable by the storage system, thereby allowing initialization of the storage system to continue using the created new root volume.

10. The system of claim 9 wherein the created new root volume is thinly provisioned.

11. The system of claim 9 wherein the root volume creation process is a module of a file system executing within a storage operating system of the storage system.

12. A method for creating a root volume for a storage system, comprising:
    scanning a set of storage devices associated with the storage system;
    determining whether a root volume is stored on the set of storage devices;
    in response to determining that no operational root volume is stored on the set of storage devices, creating a new volume as the root volume using a flexible volume, the flexible volume created with a minimum size allowable by the storage system to initialize the storage system; and
    completing initialization of the storage system using the new volume as the root volume.

13. The method of claim 12, further comprising:
    using disks as the storage devices.

14. The method of claim 12, further comprising:
    determining whether a root aggregate is stored on the set of storage device.

15. The method of claim 14, further comprising:
    creating the new volume on the root aggregate.

16. The method of claim 12, further comprising:
    thinly provisioning the new volume.

17. A computer readable medium for creating a new root volume for a storage system, the computer readable medium including program instructions for performing the steps of:
    executing an initialization routine for the storage system, the initialization routine failing because no operational root volume is associated with the storage system; and
    creating a new root volume using a flexible volume, the flexible volume created with a minimum size allowable by the storage system to initialize the storage system.

18. The computer readable medium of claim 17, further comprising:
    marking the created new root volume by asserting a root volume flag in a predetermined file associated with the created new root volume.

19. The computer readable medium of claim 17, further comprises:
    thinly provisioning the created new root volume.

20. A method for creating a new root volume for a storage system, comprising:

identifying any aggregates as a root aggregate; where the aggregate includes a plurality of disks;

in response to identifying the root aggregate, executing an initialization routing for the storage system, the initialization routine failing because there is not an operational root volume stored in the root aggregate; and in response to determining that there is not a root volume stored in the root aggregate, creating a new root volume using a flexible volume, the flexible volume created with a minimum size allowable by the storage system.

21. The method of claim 20, further comprising:

identifying the root aggregate by examining all of the disks associated with the storage system to read RAID labels stored thereon.

22. The method of claim 20, further comprising:

marking the created new root volume by asserting a root volume flag in a predetermined file associated with the created new root volume.

23. The method of claim 20, further comprising:

completing initialization of the storage system using the created new root volume.

24. The method of claim 20, further comprising:

completing the initialization using a conventional utilization sequence when the root volume is stored in the root aggregate.

25. The method of claim 1, further comprising:

using the created new root volume to initialize the storage system to a functional level.

26. The method of claim 1, further comprising:

correcting, by an administrator, any error conditions that damaged a formerly operational root volume by an administrator.

27. The method of claim 1, further comprising:

loading a set of configuration files to the new root volume to recreate the storage system.

28. The system of claim 9, further comprising:

the created new root volume used to initialize the storage system to a functional level.

29. The system of claim 9, further comprising:

an administrator to correct any error conditions that damaged a formerly operational root volume.

30. The system of claim 9, further comprising:

an administrator to load a set of configuration files to the new root volume to recreate the storage system.

* * * * *

UNITED STATES PATENT AND TRADEMARK OFFICE
CERTIFICATE OF CORRECTION

PATENT NO. : 7,467,276 B1  Page 1 of 1
APPLICATION NO. : 11/257507
DATED : December 16, 2008
INVENTOR(S) : Andy C. Kahn It is certified that error appears in the above-identified patent and that said Letters Patent is hereby corrected as shown below:

Col. 16, Line 66, please amend as shown:

[[comprises:]]comprising:

Signed and Sealed this

Twenty-fifth Day of May, 2010

David J. Kappos
*Director of the United States Patent and Trademark Office*